March 17, 1925.
G. W. SMITH
MECHANISM FOR FEEDING SHEET MATERIALS
Filed Nov. 11, 1922  3 Sheets-Sheet 1
1,529,672
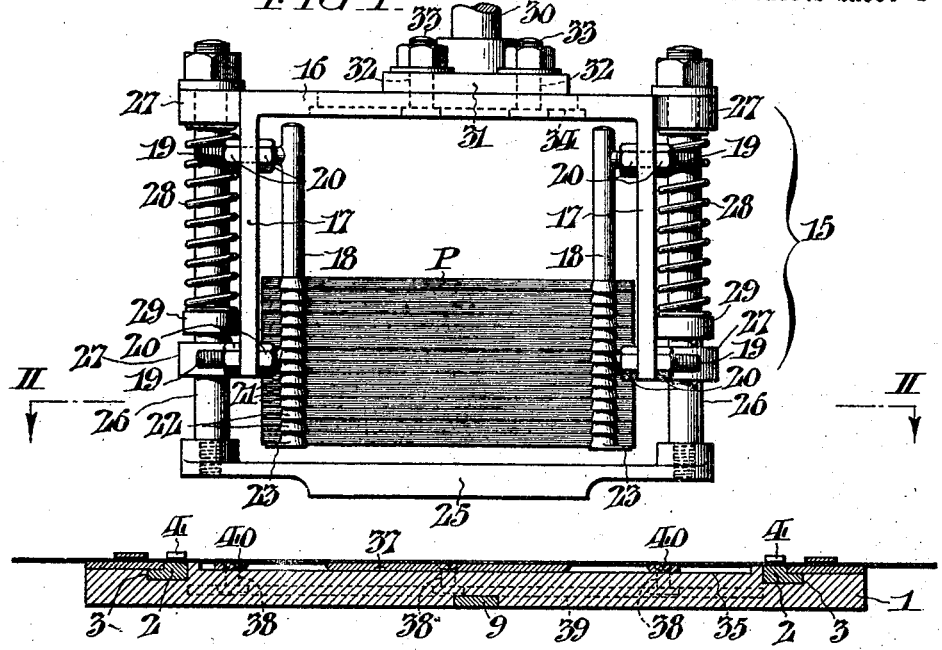
FIG. I.
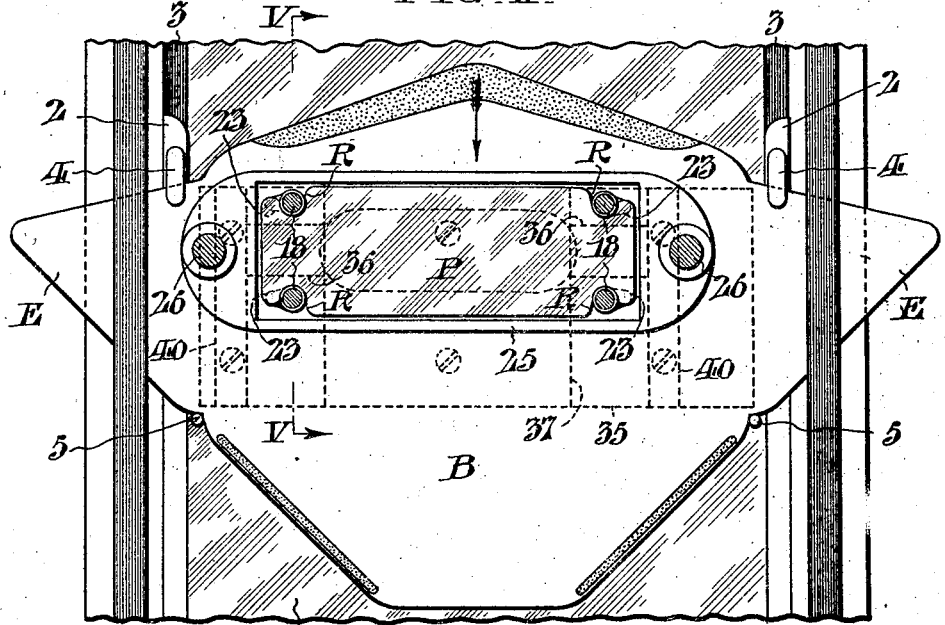
FIG. II.
WITNESSES:
INVENTOR:
George W. Smith,
BY
ATTORNEYS.

March 17, 1925.   1,529,672
G. W. SMITH
MECHANISM FOR FEEDING SHEET MATERIALS
Filed Nov. 11, 1922   3 Sheets-Sheet 2
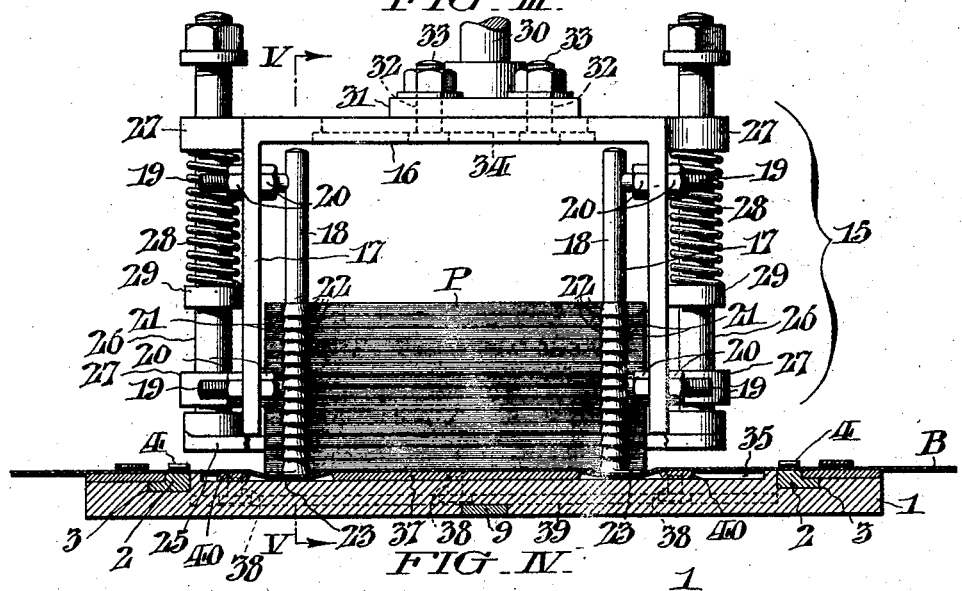
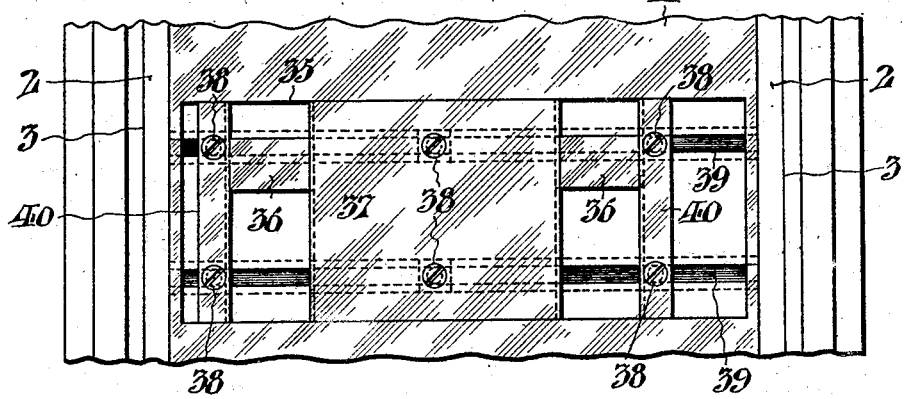
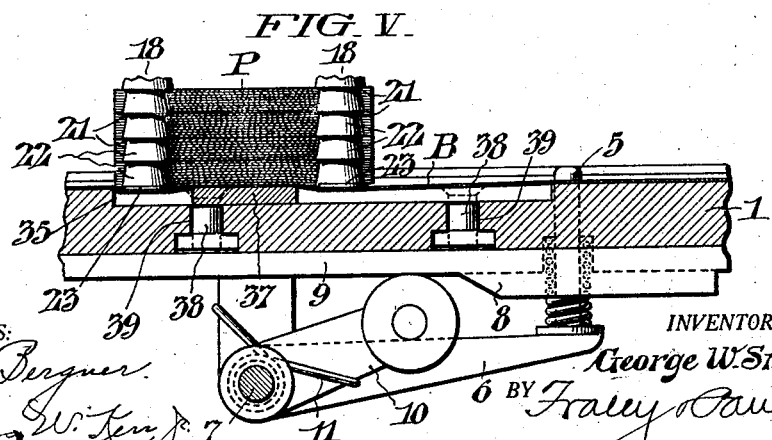
WITNESSES:
INVENTOR:
George W. Smith,
BY
ATTORNEYS.

March 17, 1925. 1,529,672
G. W. SMITH
MECHANISM FOR FEEDING SHEET MATERIALS
Filed Nov. 11, 1922 3 Sheets-Sheet 3
FIG. VI.
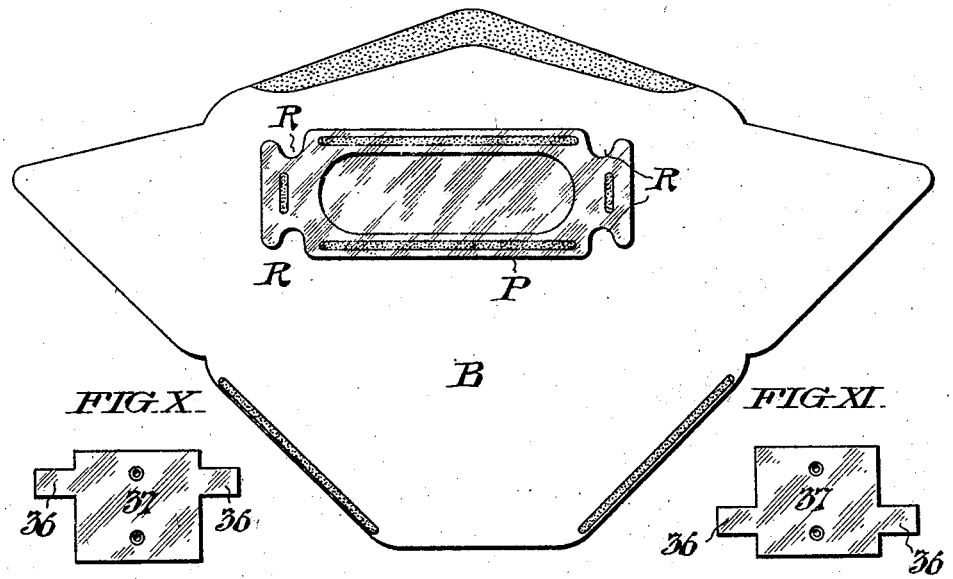
FIG. X. 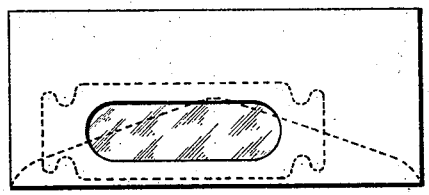 FIG. XI. 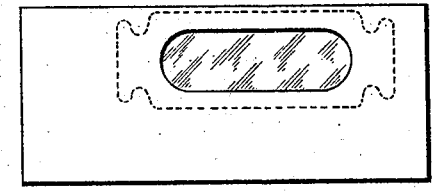
FIG. VII. FIG. VIII.
FIG. IX.
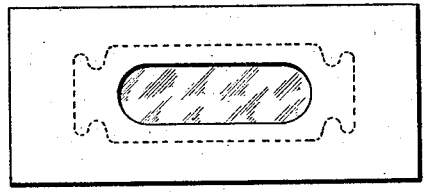
WITNESSES:
John C. Bergner
Thomas W. Kerr Jr.
INVENTOR:
George W. Smith,
BY Fraley & Paul
ATTORNEYS.

Patented Mar. 17, 1925.

1,529,672

UNITED STATES PATENT OFFICE.

GEORGE W. SMITH, OF PHILADELPHIA, PENNSYLVANIA.

MECHANISM FOR FEEDING SHEET MATERIALS.

Application filed November 11, 1922. Serial No. 600,244.

*To all whom it may concern:*

Be it known that I, GEORGE W. SMITH, a citizen of the United States, residing at Philadelphia, county of Philadelphia, and State of Pennsylvania, have invented certain new and useful Improvements in Mechanism for Feeding Sheet Materials; whereof the following is a specification, reference being had to the accompanying drawings.

My invention relates generally to mechanism for feeding sheet materials, and more especially to a type useful in association with machinery for manufacturing paper products where one sheet is to be joined to another in superposed relation by use of a suitable adhesive. Amongst the objects of my invention are to provide sheet feeding means which are positive in action, capable of controlling individual release, and of assuring firm adherence to the surface upon which the sheets are to be applied.

As will be apparent from subsequent disclosure, my invention may be employed to advantage in connection with envelop machines in applying transparent paper patches over address or window openings in the envelop blanks, and with special advantages with the type of envelop machine shown and described in Patent No. 1,234,501 granted me under date of July 24, 1917. In this machine, the lowermost patches of a stack maintained in a magazine are successively deposited upon the envelop blanks through movement of the magazine toward the table upon which the blanks are supported. In the course of this action, the stack was free to move upwardly in the magazine and the weight of the stack relied upon to press the nethermost patches into contact with the gummed margins of the apertures in the blanks. However as the stack became depleted, it very often happened that its weight was inadequate to press the nethermost patch into effective contact with the adhesive and did not result in isolation of said patch upon retraction of the magazine. On the other hand, if the stack was too heavy, the excess pressure upon the nethermost patch opposed withdrawal of the latter from behind the retaining fingers which underlap the ends of the patches to normally hold them in the magazine. Furthermore, difficulty has been experienced in effecting firm adherence of the ends of the patches to insure complete closure of the window apertures owing to the restraining effect of the retaining fingers during their doffing.

By my invention, I readily overcome the various difficulties above pointed out, and this end is accomplished through means which serve to support the transparent patches in suspension and separation in the magazine so that the weight of the stack is distributed in such a way as to relieve pressure upon the nethermost patch when the latter is being withdrawn, said means being also capable of permitting, normally, free gravitational progression of the patches in the magazine although acting to check retrogressive movement of the stack during application of the patches to the envelop blanks so that this action is accomplished with absolute positiveness through pressure thus induced.

Other objects and attendant advantages of my invention will become readily apparent from the detailed description which follows of one practical application thereof which I have chosen for convenience of exemplification; while its scope will be manifest from the appended claims.

In the drawings Fig. I is a cross sectional view of a portion of an envelop machine conveniently illustrating the parts essential to the understanding of my invention, and showing the sheet feeding means, in this instance the patch magazine, in its elevated position ready to descend in the act of applying a patch to an envelop blank arrested upon the supporting surface or table of the machine.

Fig. II is a plan sectional view taken as indicated by the arrows II—II in Fig. I.

Fig. III is a view similar to Fig. I showing the patch magazine in its lowered position in the act of applying a patch.

Fig. IV is a fragmentary plan view showing the details of a pressure plate which cooperates with the patch feeding means during patch application.

Fig. V is a detail sectional view taken as indicated by the arrows V—V in Figs. II and III.

Fig. VI is an illustration of one of the envelop blanks after the transparent patch has been applied and previous to folding.

Figs. VII, VIII, and IX show envelopes with windows in different locations illustrative of variations possible of attainment through adjustability of the patch feeding mechanism; and Figs. X and XI show modified forms of pressure plates which may be employed in lieu of the one illustrated in the preceding figures.

Referring to Figs. I to V inclusive, 1 indicates comprehensively, a supporting surface or table over which envelop blanks B are progressed longitudinally, in the direction shown by the arrow in Fig. II, through the medium of slides 2 which are guided in grooves 3 adjacent opposite side edges of said table. The sides 2 have fingers or clips 4 which overhang and engage the end flaps E of the envelop blanks. By the means just described, the blanks B are progressed until they encounter stop pins 5 which project through suitable openings in the top surface of the table 1. By reference to Fig. V it will be observed that these pins 5 are carried in the ends of arms 6 which are fixed upon a rock shaft 7 journalled beneath the table. The pins 5 are arranged to be retracted through downward movement of the arms 6 induced by engagement of a cam projection 8 on a slide bar 9 with a roller arm 10 also secured on shaft 7. Said bar 9 is guided for reciprocation in a retaining slot extending longitudinally of the table 1. In practice, means are provided for reciprocating the slide bar 9 in proper timed relation with the other movable parts of the machine, but since such means do not form a part of the present invention, illustration thereof has been omitted from the drawings. A spring 11 coiled about the rock shaft 7 functions to maintain the roller of arm 18 at all times in operative contact with the slide bar 9. The operation of the mechanism just described is so ordered that the pins 5 are retracted after the patch has been applied to an envelop blank B to permit further progression of the latter to a station (not shown) of the machine where the folding is accomplished to form the envelopes.

Suitably mounted for reciprocation perpendicularly toward and away from the table 1 in applying transparent patches to the envelop blanks B temporarily arrested on the supporting surface or table 1 as hereinbefore noted, is a means which includes a magazine 15 comprising a frame 16 with vertical side members 17 spaced so as to accommodate a stack of transparent patches P between them. To the vertical members 17 of this frame 16 are secured posts 18 having lateral threaded stud extensions 19 which pass through suitable openings in the members 16 to permit adjustment. Such adjustment may be fixed by clamp nuts 20 provided for the purpose. The posts 18 have formed in them, a succession of notches 21 configured so as to afford abrupt, downwardly facing, horizontal shoulders which are approached by inclined or conical surfaces 22. At their lower ends, the posts 18 have laterally extending fingers 23 which normally tend to retain the patches P in the magazine. Displacement of the patches in the magazine is prevented by the engagement of the posts 18 within, and with the edges of rounded recesses R at opposite sides of said patches. By reason of the characteristic configuration of the notches 21 in the posts 18, it will be readily apparent that gravitational progression of the patches P may readily take place; while on the other hand, any retractive movement of the patches P will be immediately resisted through the action of the shoulders upon the patches. Furthermore, it will be observed that the described configuration of the posts 18 is such that the patches P are sustained in separation through subdivision thereof into groups as indicated by the occasional heavier lines in Fig. I. By supporting the patches in this way, the weight of the stack is distributed and therefore does not tend to prevent the withdrawal of the nethermost patch from behind the fingers 23 in the course of the application of the patch to the envelop blank.

Coordinated with the patch magazine 15 is a stripper 25 which is generally oval in configuration, as best shown in Fig. II, and provided with a rectangular opening of ample dimensions for permitting traverse of the patches P. The stripper 25 is supported at opposite ends by rods 26 which are slidable within bosses 27 of the frame 16 and subject to springs 28 tending to exert downward thrust upon collars 29 secured upon said rods. As the magazine 15 is bodily lowered, the stripper 25 is the first to encounter the envelop blank and holds the blank against shifting while the magazine proper continues its descent overcoming the springs 28 until the nethermost patch P engages the awaiting blank B. Conversely, in the retraction of the magazine 15, the stripper 25 tarries to hold the blank against being raised while the nethermost patch P is withdrawn from the stack through adherence of the same to the gum about the opening in the envelop blank.

For the purpose of adapting the machine to applying patches P when the window openings are disposed in different locations in the envelopes, the magazine is secured with provisions for adjustment both laterally and longitudinally with respect to the table 1, to the rod 30 by which it is suspended from its actuating means, not shown. The devices to this end include a fitting 31, with longitudinally extending slots 32, attached to the lower end of the rod 30, and bolts 33 by which the magazine 15 is clamped in adjusted positions, said bolts passing through a slot 34 (at right angles to those first mentioned) in the horizontal portion of the frame 16.

In order to insure intimate contact of the patches P with the adhesive gum adjacent the ends of the window openings, I provide for flexure of the ends of the patches and the underlying contiguous portions of the envelop blanks B in the intervals between the respective pairs of the posts 18. This is effected by bringing the lower ends of said posts 18 below the level of the top surface of the table 1, the latter being for this reason provided with a recess 35, and by arresting the blank in the intervals between the posts through aid of plates 36, see Fig. V. Incidentally to this action, the lowermost shoulders of the posts 18 become effective in exerting pressure upon the lower group of patches so that the ends of the patches are flexed downwardly about the edges of the plates 36, this pressure being transmitted in turn to the envelop blank thus resulting in intimate contact of the nethermost patch with the adhesive gum on the blank. The plates 36 referred to constitute in effect, flanking end elongations of a broader section 37 of what, for convenience, I will term comprehensively, a pressure plate. This group of elements is bodily adjustable laterally of the table 1 within the transversely extending recess 35 so that it may be positioned in correspondence with the patch magazine 15 when the machine is set for accommodation of blanks with differently allocated window apertures. In order that such adjustments of the constituent elements of the pressure plate may be fixed, clamp bolts 38 are provided, these being engaged within undercut transverse grooves 39 of the table 1. The prolongations 36 may be adjusted independently of the main section 37 so as to underlie the ends of the window openings in the blanks (also the superimposed patches) in accordance with the setting of the machine as already understood. This adjustment is made possible through aid of holder plates 40 whose side edges, like those of the main section 37, are beveled to overlap the correspondingly beveled edges of the prolongations 36. The adjusted positions of the clamp plates may be secured against displacement by bolts of the series 38. It is to be particularly observed that the main section of the pressure plate is of even width with the recess 35, and, together with its auxiliaries, is flush with the top surface of the table 1 so that a continuous and unobstructed surface is afforded for traverse of the envelop blanks B.

As an alternative, I may provide in place of the composite pressure plate hereinbefore described, a set of interchangeable plates with the prolongations 36 integral with the main section as shown in Figs. X and XI. By proper interchange of such integral plates or proper adjustment of the composite plate in correspondence with adjustments of the patch feed, it will be at once apparent to anyone skilled in this art that the machine may be adapted for application of window patches to any of the forms of envelopes shown in Figs. VII to IX inclusive.

Having thus described my invention, I claim:

1. Mechanism of the character described including a supporting surface for window apertured envelop blanks, in combination with means for applying transparent patches to the envelop blanks over the window apertures, and means for incidentally flexing the edges of the patches and contiguous portions of the underlying blanks downwardly below the level of the supporting surface to insure more intimate contact of the patches with adhesive gum about the window apertures.

2. Mechanism of the character described including a supporting surface for window apertured envelop blanks, in combination with means for applying transparent patches to the envelop blanks over the window apertures, and means for incidentally flexing the ends of the patches and contiguous portions of the blanks downwardly below the level of the supporting surface to insure closure of the ends of the window apertures.

3. Mechanism of the character described including a pressure plate for supporting window apertured envelop blanks, in combination with means for applying patches over the apertures in the blanks, and instrumentalities for incidentally flexing the edges of the patches and contiguous portions of the underlying blank downwardly to opposite sides of the pressure plate to insure intimate contact of the patches with adhesive gum about the window apertures.

4. Mechanism of the character described including a pressure plate for supporting window apertured blanks, said plate having comparatively narrower prolongations extending beyond the ends of a main or body portion adapted to underlie the ends of the window apertures, in combination with means for applying transparent patches over the window apertures in the blanks, and means for incidentally flexing the ends of the patches and contiguous portions of the underlying blank downwardly about the prolongations of the pressure plate to insure intimate contact of ends of the patches with adhesive gum about the window apertures.

5. Mechanism of the character described including a table over which envelop blanks are longitudinally progressed to a station for application of transparent patches over the window apertures in the blanks, means movable perpendicularly relative to the table at the station aforesaid for applying the patches to the blanks, said means being adjustable for different allocation of the apertures in the blanks, a plate cooperating with the patch applying means upon which the envelop blanks are temporarily supported at the patch applying station comprising a main section adjustable laterally of the table aforesaid in correspondence with adjustments of the patch applying means in a transverse depression of even width on the table so as to be flush with the latter and afford an unobstructed surface for the envelop blanks, said plates also comprising flanking end prolongations of lesser widths independently adjustable in a direction longitudinally of the table and adapted to underlie the ends of the transparent patches, and means functioning incidentally to the patch applying operation in flexing the ends of the patches and contiguous portions of the underlying blanks downwardly over the edges of the pressure plate prolongations and into the table depression aforesaid to insure closure of the ends of the window apertures through intimate contact with adhesive gum previously applied at these regions.

In testimony whereof, I have hereunto signed my name at Philadelphia, Pennsylvania, this 7th day of November, 1922.

GEORGE W. SMITH

Witnesses:
JAMES H. BELL,
E. L. FULLERTON.